3,553,029
ELECTRODE WITH CARBON LAYER AND FUEL CELL THEREWITH
Karl V. Kordesch, Lakewood, and William G. Darland, Jr., Parma, Ohio, assignors to Union Carbide Corporation, a corporation of New York
Continuation of application Ser. No. 477,173, Aug. 4, 1965. This application July 17, 1969, Ser. No. 847,508
Int. Cl. H01m 27/00
U.S. Cl. 136—86               5 Claims

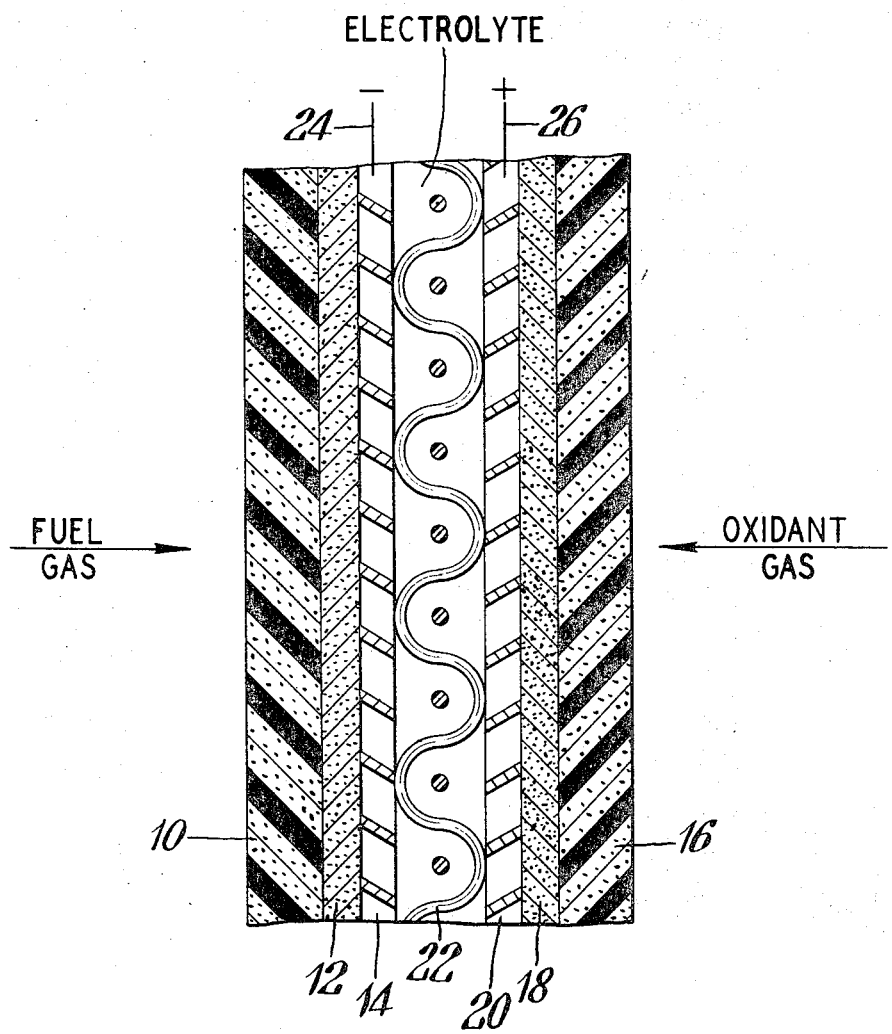

ABSTRACT OF THE DISCLOSURE

A fuel cell including a multilayer electrode comprising (a) a metal liquid repellent, gas permeable layer, (b) a liquid permeable, conductive layer, and (c) a middle layer containing carbon. Where the electrode is a fuel electrode, the middle layer is catalyzed with metals catalytically active in fuel cell anode reactions. The repellent can be a hydrophobic resin, such as polytetrafluoroethylene.

---

This application is a continuation of application Ser. No. 477,173, filed Aug. 4, 1965, which is in turn a continuation-in-part of application Ser. No. 455,988, filed May 14, 1965, and now abandoned.

This invention relates to electrode structures. More particularly, the invention is directed to multilayer electrode structures which are useful as fuel cell electrodes.

Multilayer fuel cell electrodes are known. A typical electrode of this type comprises two metallic plaques, one of which has relatively large pores (5–10 microns), and the other relatively fine pores (1–2 microns), and a layer of catalytic material, for example, platinum black, between the two plaques. When used in a fuel cell, the gas pressure is adjusted so that the gas keeps the electrolyte out of the large pores of the porous plaque on the gas side of the electrode, but permits the small pores on the electrolyte side to fill with liquid. The catalyst layer is then in a semi-wet transition zone where gas and electrolyte meet. The catalyst then functions as an ionization catalyst (anode) or peroxide decomposition catalyst (cathode), depending upon whether the electrode is a fuel or oxidant electrode.

The structure described in the preceding paragraph is subject to several disadvantages. For example, it is difficult to obtain a uniform catalyst layer between the metal plaques, and the gas pressure must be carefully controlled in order to maintain the semi-wet catalyst zone.

It is an object of the present invention to provide an improved multilayer electrode structure. A further object of the invention is to provide a multilayer fuel cell electrode not subject to the disadvantages described above. A further object of the invention is to provide a multilayer fuel cell electrode in which the porosity of the structural materials and the gas pressures in the operating fuel cell are not critical.

The single figure is a cross-sectional representation of a fuel cell in which the electrodes are multilayer electrodes of this invention.

The electrode of this invention is a multilayer structure comprising a liquid repellent, gas permeable layer, a liquid permeable, conductive outer layer, and a middle layer containing carbon. Where the electrode is a fuel electrode, the carbon middle layer is catalyzed with metals catalytically active in fuel cell anode reactions.

In one important embodiment of the invention, the gas-permeable layer is electrically conductive and the middle layer comprises carbon powder. In another important embodiment of the invention, the gas-permeable layer is not electrically conductive and the middle layer is plastic bonded carbon powder.

In the first of these important embodiments, the electrode of this invention is a three layer structure which comprises a conductive liquid repellent gas-permeable outer layer, a porous liquid-wettable conductive outer layer, and a middle layer of carbon powder. The gas permeable liquid repellent layer serves as the gas side of the electrode structure while the liquid wettable conductive layer (electrolyte side of the electrode) serves to hold the catalyzed carbon powder in place and provides access to the catalyzed layer for the electrolyte. In some structures, the liquid wettable layer can also serve as a conductor and/or current collector. When the electrode is a fuel electrode, the middle layer comprises carbon powder on and within which a metal catalytically active in fuel cell anode reactions has been deposited.

The pore sizes in the materials comprising the two outer layers in the electrode of this embodiment are not critical, because the use of a liquid repellent outer layer establishes a three phase zone (gas-active surface-electrolyte) at the interface between the liquid repellent layer and the carbon powder, within the layer of carbon powder, or at the interface between the carbon powder layer and the liquid-wettable layer on the electrolyte side.

The structural material employed in the conductive liquid repellent layer or the liquid wettable layer can be any of the materials conventionally employed in fuel cell electrodes. For example, either of the (outer) porous layers can be substantially pure carbon such as graphite or activated porous carbon, a mixture of carbon with a metal such as nickel or iron, or a pure metal such as nickel, silver or copper (hydrogen electrode only), stainless steel or tantalum. A preferred structural material is thin porous nickel, since thin materials containing carbon provide less structural strength. Flexible electrodes can be obtained by the use of nickel or graphite plaques having a thickness in the range of 5–50 mils. As mentioned above, the pore size or the (outer) porous layers is not critical, but pore sizes in the 1–10 micron range have proved to be particularly satisfactory. All the structural materials described in this paragraph are electrically conductive.

The porous outer layers in the electrodes of this invention can also include other structural units, for example, a perforated nickel plate as the porous outer layer or a nickel screen embedded in the porous outer layer material, provided the pores or openings are sufficiently small to hold the carbon powder in place.

The three layers in the electrode structure of this embodiment can be held together by mechanical means, for example, by means of the conventional separators which space the fuel and oxidant electrodes in a fuel cell battery. However, for ease of fabrication, an electrolyte compatible adhesive material (glue) can be mixed with the carbon powder to cement the outer structural layers together during assembly of a fuel cell or fuel battery. Suitable electrolyte compatible adhesives include materials which dissolve in the electrolyte such as starch, agar-type gels, and the like, as well as materials which are ion-permeable (although electrolyte insoluble) such as sodium carboxymethyl cellulose, potassium carboxymethyl cellulose, polyvinyl chloride, and the like.

Methods for producing porous carbon, carbon-metal and metal plaques for use in fuel cell electrodes are well known.

Similarly wet proofing agents for such electrode structural materials and methods for applying the wetproofing agents are well known.

Where the conductive gas-permeable layer is not naturally liquid repellent, it can be treated with one or more wetproofing agents. Suitable wetproofing agents for carbon-containing fuel cell electrode structures include, for example, paraffin oils; paraffin waxes; halogenated paraffin oils; halogenated paraffin waxes; low molecular weight polyolefins, such as polyethylene and polypropylene; polytetrafluoroethylene, aliphatic monohydroxy alcohols containing between about 8 and about 18 carbon atoms; halogenated naphthalenes, such as chloronaphthalene; perfluorochloroethylenes; dibenzyl ether; and the like. For wetproofing metal fuel cell electrode structures, any of the above-listed wetproofing agents which are solid at the fuel cell operating temperature can be used. Low molecular weight polyolefins and polytetrafluoroethylenes are particularly suitable for wetproofing porous metal structures.

Illustrative methods for applying wetproofing agents are set forth in U.S. Pat. 3,160,530 and Canadian Pat. No. 695,422. As a further illustration, a nickel plaque, for example, a sintered porous nickel plaque 0.035 inch thick and having a porosity of 80 percent, can be wetproofed by impregnating it with polytetrafluoroethylene. This can be done by spraying the nickel plaque with an emulsion containing polytetrafluoroethylene resin (about 60% solids). The amount of resin emulsion applied is controlled to provide about 0.1 gram of resin per square inch of nickel plaque. The sprayed nickel plaque is then dried in air at about 100° C., and finally heated in an inert atmosphere at about 400° C. for about two hours.

Catalyzed carbon powder suitable for use in the middle layer of the fuel electrodes of this embodiment can be prepared as follows:

The carbon powder to be catalyzed preferably should be activated and should be in the form of loose, non-compacted, finely divided particles, such as carbon flour. The particle size of the carbon is not critical.

The activated carbon particles are preferably catalyzed by reacting thereon an aqueous solution containing both a noble metal salt and a reducing agent for the metal moiety of the salt. The reducing agent reduces the metal moiety and deposits the noble metal as a catalyst on the carbon particles. This process can be used to deposit any of a number of known noble metal catalysts, the most useful of which are rhodium, iridium, palladium, platinum, silver, gold, ruthenium, and osmium and mixtures of these metals. The choice of specific catalysts depends mainly on the intended use of the electrode to be made from the catalyzed carbon particles.

Any noble metal salt which forms water soluble or gaseous reaction products can be used in this process. Chlorides are generally preferred, but many other salts such as acetates and nitrates are also suitable.

In general, any reducing agent can be employed which produces water soluble or gaseous reaction products and which is capable of reducing the metal moiety of the particular metal salt dissolved in the aqueous solution. The reducing agent must have a reduction potential above the reduction potential of the metal moiety to be reduced in the aqueous solution. Examples of reducing agents which are suitable for use with the aforementioned metals are hydrazine, formaldehyde, formic acid, oxalic acid, and potassium borohydride.

Hydrazine is especially useful as a reducing agent because it is an excellent reducing agent for the noble metals, and it produces reaction products which can be easily removed from the catalyzed carbon by volatilization or washing.

The reduction reaction of the noble metal salt and the reducing agents mentioned above is exothermic and generally goes to completion very rapidly at room temperature, especially in strongly alkaline solutions.

While the pH of the alkaline media for the noble metal salt reduction is not critical, the reaction takes place much faster as the pH of the solution is increased. An alkaline media having a pH of at least about 10 is preferred for most reducing agents. The alkaline media may be aqueous KOH or $NH_4OH$, or any other media which produces volatile and/or water soluble reaction products with the particular noble metal salt and reducing agent employed.

The proportion of noble metal salt to carbon particles in the soution depends mainly on the concentration of catalyst desired in the final catalyzed carbon particles. In the case of catalyzed carbon for use as the active surface layer of fuel cell electrodes, it is preferred to deposit the noble metal catalyst in a concentration of between about 0.5 and about 10 milligrams/$cm.^2$, suitably between about 1 and 6 milligrams/$cm.^2$. The proportion of reducing agent to noble metal salt in the alkaline solution is not critical, but it is generally preferred to have an excess of reducing agent over that needed for stoichiometric reaction with the metal salt, to insure complete reduction of the metal salt. Any excess amount of the reducing agent are usually decomposed during the highly exothermic reaction.

After the noble metal catalyst has been deposited on the carbon particles, the loose carbon particles should be thoroughly washed with water or another suitable solvent to remove the reaction products and any residual noble metal salt or reducing agent. After washing, the catalyzed carbon particles are dried, and are then ready for use in the formation of an electrode of this invention.

As an example of preparing catalyzed carbon particles, five grams of activated carbon flour were mixed with three milliliters of a cencentrated rhodium-palladium chloride catalyst stock solution, five milliliters of saturated potassium hydroxide (KOH), five grams of solid hydroxylamine hydrochloride (about 42 weight percent of the entire mixture), and enough water to form a paste. The catalyst stock soution contained 9.8 grams rhodium chloride ($RhCl_3$) and 1.3 grams palladium chloride ($PdCl_3$) and 16 milliliters of water to a total volume of 20 milliliters. The reduction reaction occurred practically instantaneously, and the resulting catalyzed carbon flour was filtered, washed with water, and dried under a vacuum.

The following three examples further illustrate the electrode structure of this invention in which the gas permeable layer is conductive and the middle layer is carbon powder.

EXAMPLE 1

(A) An electrode of this invention was constructed which comprises a layer of platinum catalyzed activated carbon powder between a ¼″ thick porous carbon plate wetproofed by immersion in a petroleum ether solution of paraffin and a 10 mil thick 30 percent porous (non-wetproofed) nickel plaque. The electrode was prepared by coating the wetproofed carbon plate with an aqueous slurry of the platinum catalyzed carbon powder which was allowed to dry and then covered with the nickel plaque. The three layer assembly was mechanically pressed together.

(B) Another electrode of this invention was prepared as follows: A nickel plaque 80 percent porous wetproofed by impregnation with polyethylene was coated with a layer of platinum catalyzed activated carbon powder bonded together by sodium carboxymethyl cellulose, and a second (unwetproofed) 25 mil thick 80 percent porous nickel plaque was pressed against the catalyzed carbon layer.

Each of these electrodes was employed as a hydrogen fuel electrode in two different operating fuel cells with conventional oxygen electrodes and KOH electrolytes. Each electrode initially produced about 300 amperes per square foot at 0.5 volt versus zinc reference electrode and, after three months of continuous operation, each electrode produced about 100 amperes per square foot at 0.6 volt versus zinc.

EXAMPLE 2

A fuel cell was constructed in which the hydrogen electrode had the structure of the electrode of Example 1(A) hereinabove and the oxygen electrode was a ¼″ thick porous activated carbon plate. A conventional potassium hydroxide electrolyte was employed. It was found that hydrogen gas pressure of up to 5 p.s.i.g. did not cause gas to bubble into the electrolyte, demonstrating that the wet porous layer provides a good gas barrier in the electrode structure of this invention. During operation, this cell produced currents of 50 milliamperes per square centimeter at 0.84 volt and 150 milliamperes per square centimeter at 0.80 volt.

EXAMPLE 3

Another fuel cell was constructed identical to the cell of Example 2 except that an electrode having the structure of electrode of Example 1(B) hereinabove was employed as the hydrogen electrode. This cell produced currents of 50 milliamperes per square centimeter at 0.85 volt, 100 milliamperes per square centimeter at 0.80 volt and 150 milliamperes per square centimeter at 0.74 volt.

In another important embodiment of this invention the gas-permeable liquid repellent layer is non-conductive and the middle layer is a plastic bonded carbon powder composition, on which suitable catalysts are deposited when the electrode is to be used as a fuel electrode. The gas permeable liquid repellent layer can be any non-conductive material having these properties, such as porous plastics, wetproofed fibrous glass mats, wetproofed porous ceramic plates, and the like. The wetproofing agents described hereinabove can be employed where necessary. Because of their inherent liquid repellent properties, porous plastics such as porous polyethylene, porous polytetrafluoroethylene, porous polyvinyl chloride, and the like are preferred.

The middle layer in the electrode structure of this embodiment can be carbon powder mixed with a plastic binder. For fuel electrodes, the carbon powder-plastic binder composition con be catalyzed after the powder-binder mix is distributed over the gas permeable liquid repellent layer.

The middle layer can be prepared by spraying a mixture of activated carbon powder and a plastic such as polystyrene, polyethylene, polytetrafluoroethylene and polyperfluorochloroethylenes onto the non-conductive gas permeable liquid repellent layer, and then smoothing and pressing the carbon-plastic mixture into place. For fuel electrode, the carbon-plastic mixture is treated with an aqueous solution containing a salt of a catalyst metal active in fuel cell electrode reactions and then heated at about 100° C. to decompose the metal salt to the metal. Suitable catalytically active metals are those described hereinabove.

The non-wetproofed outer layer in the electrode structure of this embodiment can be a conductive metal current collector which can be pressed against the plastic bonded carbon layer to make electrical contact. Since the plastic bonded carbon layer is a unitary structure, the non-wetproofed conductive outer layer does not have to serve the function of holding the active carbon-plastic layer in place; the outer layer serves the sole function of a current collector. Accordingly, this outer layer can be a metal screen, for example, nickel wire screen, or an expanded metal sheet as well as a porous metal plaque or perforated metal plate.

The drawing illustrates (in cross section) a fuel cell constructed from the two of the above-described electrodes. The fuel electrode comprises a porous plastic sheet 10, a layer 12 of plastic bonded carbon powder on which is deposited a suitable catalyst, and an expanded metal current collector 14. The oxidant electrode comprises a porous plastic sheet 16, a layer 18 of plastic bonded carbon powder (which can also be treated with a catalyst if desired), and an expanded metal current collector 20. The two electrodes are separated by a plastic screen 22, and the space between the electrodes is filled with electrolyte. Instead of the plastic screen 22, an expanded plastic sheet or other non-conductive material having an open structure can be used. Current carrying leads 24 and 26 are connected to the current collectors 14 and 20, respectively.

In a typical structure of the type illustrated in the drawing, each porous plastic sheet has a thickness of about 20 mils, each plastic bonded carbon layer and current collector is about 10 mils thick and the plastic screen separating the electrodes is about 25 mils thick. Thus each electrode has a thickness of only about 40 mils and the two-electrode fuel cell unit a thickness of only about 100 mils.

Another advantage of the electrode structure of this embodiment is that the non-conductive gas permeable layer can be completely liquid repellent, since current can be taken off on the opposite (non-wetproofed, electrolyte) side of the electrode. When current is taken off on the gas side of the electrode, conductivity must be maintained in the gas-permeable layer on this (gas) side, and complete liquid repellency is not possible without seriously reducing the conductivity. The substantially completely liquid repellent gas permeable layers in the electrodes of this invention make it possible to eliminate any significant "creep" or penetration of the fuel cell electrolyte through the electrode and onto the gas face of the electrode.

The following two examples further illustrate the electrode structure of the invention in which the gas-permeable layer is non-conductive and the middle layer is plastic-bonded carbon powder.

EXAMPLE 4

(A) A 70 percent porous polyethylene sheet (1/32″ thick) was sprayed with an emulsion containing activated carbon powder and polyethylene resin, and two layer structure was pressed for a short time under a hot platen (about 100° C.). The plastic-bonded carbon layer was about 10 mils thick, and contained about 88 weight percent activated carbon powder and about 12 weight percent polyethylene. The two layer structure was treated with an aqueous solution of platinum chloride and rhodium chloride and heated for about 16 hours at 100° C. The plastic-bonded carbon powder layer then contained about 1 milligram of catalytically active metal per square centimeter of electrode surface. A copper screen about 10 mils thick was pressed against the catalyzed plastic bonded carbon layer, thus completing the three layer structure.

(B) A sheet of porous polytetrafluoroethylene about 1/32″ thick was sprayed with an aqueous emulsion of activated carbon powder and polytetrafluoroethylene resin. The two layer structure was pressed smooth and heated at about 400° C. for several hours. The plastic bonded active carbon layer was about 10 mils thick, and contained about 75 weight percent activated carbon powder and about 25 weight percent polytetrafluoroethylene. A silver screen about 10 mils thick was pressed aainst the plastic bonded activated carbon layer to complete the three layer structure.

EXAMPLE 5

Electrodes prepared as described in Example 4(A) and Example 4(B) were used, respectively, as the hydrogen electrode and oxygen electrode in an operating fuel cell. The electrodes were separated by a plastic screen located in the electrolyte compartment. Current was taken off by appropriate electrical connections made to the copper and silver screens. The following results were obtained when the fuel cell was operated at 50° C. with 12 normal KOH electrolyte.

| Current density, milliamperes/cm.$^2$: | Voltage, resistance free |
|---|---|
| 25 | 0.88 |
| 50 | 0.84 |
| 100 | 0.82 |

We claim:
1. In a fuel cell comprising a liquid electrolyte and a pair of spaced electrodes for electro-chemically reacting a fuel gas and an oxidant gas, the improvement which comprises: at least one of said electrodes comprising (a) a conductive liquid repellent layer composed of wetproofed porous metal permeable to one of said gases, (b) a conductive liquid-wettable layer composed of porous metal in contact with said electrolyte, and (c) disposed between and in contact with said layers (a) and (b) a layer of carbon powder.

2. In a fuel cell in accordance with claim 1 wherein said liquid repellent gas permeable layer is wetproofed porous nickel.

3. In a fuel cell in accordance with claim 1 wherein said conductive liquid-wettable layer is porous nickel.

4. In a fuel cell in accordance with claim 1 wherein said carbon powder has deposited thereon and therethrough one or more of the metals rhodium, iridium, palladium, platinum, ruthenium, osmium, silver and gold.

5. An electrode which comprises (a) a gas permeable layer of porous nickel wetproofed with polytetrafluoroethylene (b) a layer of porous nickel, and (c) a layer of platinum catalyzed activated carbon powder disposed between and in contact with said layers (a) and (b).

References Cited

UNITED STATES PATENTS

| | | | |
|---|---|---|---|
| 3,057,943 | 10/1962 | Strauss | 136—6 |
| 3,222,224 | 12/1965 | Williams et al. | 136—86 |
| 3,235,473 | 2/1966 | Le Duc | 136—120 |
| 3,236,693 | 2/1966 | Caesar | 136—86 |
| 3,242,011 | 3/1966 | Witherspoon | 136—122 |
| 3,077,507 | 2/1963 | Kordesch et al. | 136—121 |
| 3,226,263 | 12/1965 | Oswin | 75—222 |
| 3,252,839 | 5/1966 | Langer et al. | 136—121 |
| 3,276,911 | 10/1966 | Schoeneweis | 136—86 |
| 3,297,482 | 1/1967 | Zimmer | 136—86 |
| 3,306,780 | 2/1967 | Dieberg | 136—121 |

FOREIGN PATENTS

| | | | |
|---|---|---|---|
| 1,303,600 | 8/1962 | France | 136—86 |

ALLEN B. CURTIS, Primary Examiner